United States Patent [19]

Hamilton

[11] Patent Number: 5,727,739
[45] Date of Patent: Mar. 17, 1998

[54] NOZZLE WITH QUICK DISCONNECT SPRAY TIP

[75] Inventor: Richard J. Hamilton, West Chicago, Ill.

[73] Assignee: Spraying Systems Co., Wheaton, Ill.

[21] Appl. No.: 607,376

[22] Filed: Feb. 27, 1996

Related U.S. Application Data

[63] Continuation-in-part of Ser. No. 397,914, Mar. 3, 1995, abandoned.

[51] Int. Cl.⁶ ............................................. B05B 1/00
[52] U.S. Cl. ........................................ 239/600; 285/361
[58] Field of Search ............................... 239/600; 285/360, 285/361, 376, 396, 401, 402; 277/165, 168, 184; 222/568, 570

[56] References Cited

U.S. PATENT DOCUMENTS

| | | | |
|---|---|---|---|
| 1,968,075 | 7/1934 | Ewald | 285/401 X |
| 4,438,884 | 3/1984 | O'Brien et al. | 285/376 X |
| 4,736,401 | 4/1988 | Filicichia | 285/360 X |
| 4,820,285 | 4/1989 | Leise et al. | 285/376 X |
| 4,869,428 | 9/1989 | Gombar | 285/360 X |
| 5,190,224 | 3/1993 | Hamilton | 239/600 |
| 5,326,036 | 7/1994 | Wilger | |
| 5,421,522 | 6/1995 | Bowen | 239/600 |
| 5,538,040 | 7/1996 | Huber et al. | 137/614.19 |

FOREIGN PATENT DOCUMENTS

| | | |
|---|---|---|
| 0 279 992 A2 | 8/1988 | European Pat. Off. |
| 2 274 495 | 7/1994 | United Kingdom |
| 1048046 | 11/1996 | United Kingdom |

*Primary Examiner*—Robert J. Oberleitner
*Assistant Examiner*—Pamela J. Lipka
*Attorney, Agent, or Firm*—Leydig, Voit & Mayer, Ltd.

[57] ABSTRACT

A quick disconnect nozzle comprising a nozzle body, a spray tip, and an annular sealing member interposed therebetween. The tip is adapted to be inserted axially into the body and then rotated. When the tip is rotated, camming lugs on the tip and body coact to draw the tip axially toward the body and compress the sealing member. Detents in the form of flexible curved ribs are carried by the tip and resiliently pop into curved pockets in the body to releasably hold the tip in its installed position. The sealing member is an O-ring which is carried by the tip and which is removable from the body as a unit with the tip. An inner seal is provided between mutually converging tapered walls of the nozzle tip and nozzle body adjacent the inner end portion of the nozzle tip.

28 Claims, 11 Drawing Sheets

NOZZLE WITH QUICK DISCONNECT SPRAY TIP

This is a continuation-in-part of my application Ser. No. 08/397,914 filed Mar. 3, 1995, now abandoned, the disclosure of which is incorporated herein by reference.

BACKGROUND OF THE INVENTION

This invention relates generally to spray nozzles and, more particularly, to a spray nozzle having a nozzle body and a nozzle tip which are coupled by quick disconnect means permitting quick and easy disassembly of the tip from the body for purposes of cleaning the tip or replacing the tip when the tip becomes worn. The same body often may be used with interchangeable tips capable of producing different spray patterns.

A spray nozzle of the above type which has enjoyed considerable success is disclosed in commonly assigned Hamilton U.S. Pat. No. 5,190,224. Another nozzle of a generally similar type is disclosed in U.S. Pat. No. 5,421,522.

The interior of the body of the prior nozzle in the aforementioned Hamilton patent includes thin curved walls defining resilient detents which coact with detents on the nozzle tip to releasably lock the tip in assembled relation with the body. After prolonged use of the nozzle and repeated removal and replacement of the tip, the resilient detents in the nozzle body tend to become permanently deformed. Such deformation causes the detents to lose a crisp feel as the tip moves to its fully assembled position.

The nozzle disclosed in the aforementioned Hamilton patent also includes a sealing ring contained and retained within the nozzle body and establishing a fluid-tight seal between the outer side of the tip and the inner side of the body. When the tip is removed, the sealing ring may accidentally become dislodged and fall out of the body. The user may not notice the absence of the sealing ring and may install the new tip without there being a sealing ring in place to establish a seal between the tip and the body. Moreover, a tool usually must be used to dislodge the sealing ring from the body when replacement of the sealing ring is required.

The aforementioned U.S. Pat. No. 5,421,522 provides for retention of the sealing rings on the removable tip, but utilizes a different and relatively complex interlocking arrangement. Also, it utilizes the resilient compression of the inner O-ring to displace the tip outward relative to the body for detent locking purposes.

SUMMARY OF THE INVENTION

One of the objects of the present invention is to provide a new and improved quick disconnect spray nozzle which is capable of being mass produced in relatively small sizes in order to accommodate space limitations.

A further object of the invention is to provide a spray nozzle of the foregoing type in which spray tips may be repeatedly inserted into and removed from the nozzle body while maintaining a crisp detent action between the tip and the body.

A further object is to achieve the foregoing by providing a nozzle in which a detent defined by a flexible curved wall is formed on the spray tip rather than in the nozzle body so that replacement of a used tip with a new tip also results in the nozzle being provided with a new flexible detent providing a good detent feel to the user.

Yet another object is to provide a quick disconnect spray nozzle of the above character in which a sealing ring may be easily seen and is readily accessible for removal and replacement when the tip is removed from the nozzle body.

The invention also resides in the novel mounting of the sealing ring on the spray tip in such a manner as to enable easy endwise insertion of the tip into the nozzle body while effecting radial compression of the sealing ring when the tip is turned within the body to its finally installed position.

Another object of this invention is to provide new and improved designs for effecting radial compression of the sealing ring between the tip and the nozzle body as the tip is inserted and locked in the body.

Another object of this invention is to provide secure retention and positive location of the sealing ring.

It is another object of this invention to effect positive sealing pressure of the sealing ring against both the tip that is circumscribed by the ring and the surrounding wall of the body.

It is a more specific object to obtain redistribution of the cross sectional volume of the sealing ring to assure effecting such a positive seal from the axial force available in the normal seating of the tip in the nozzle body.

It is another object of this invention to provide a nozzle structure which assures relative ease of withdrawal of the tip after extended periods of nozzle operation, even in the event that a solid deposit has accumulated against the upstream side of the sealing ring.

It is a further object of this invention to provide an outer configuration of the downstream portion of the nozzle tip which facilitates manufacture, marking and manipulation of the tip during insertion, seating and withdrawal of the tip from a mating nozzle body.

These and other objects and advantages of the invention will become more apparent from the following detailed description when taken in conjunction with the accompanying drawings.

Figure 1:
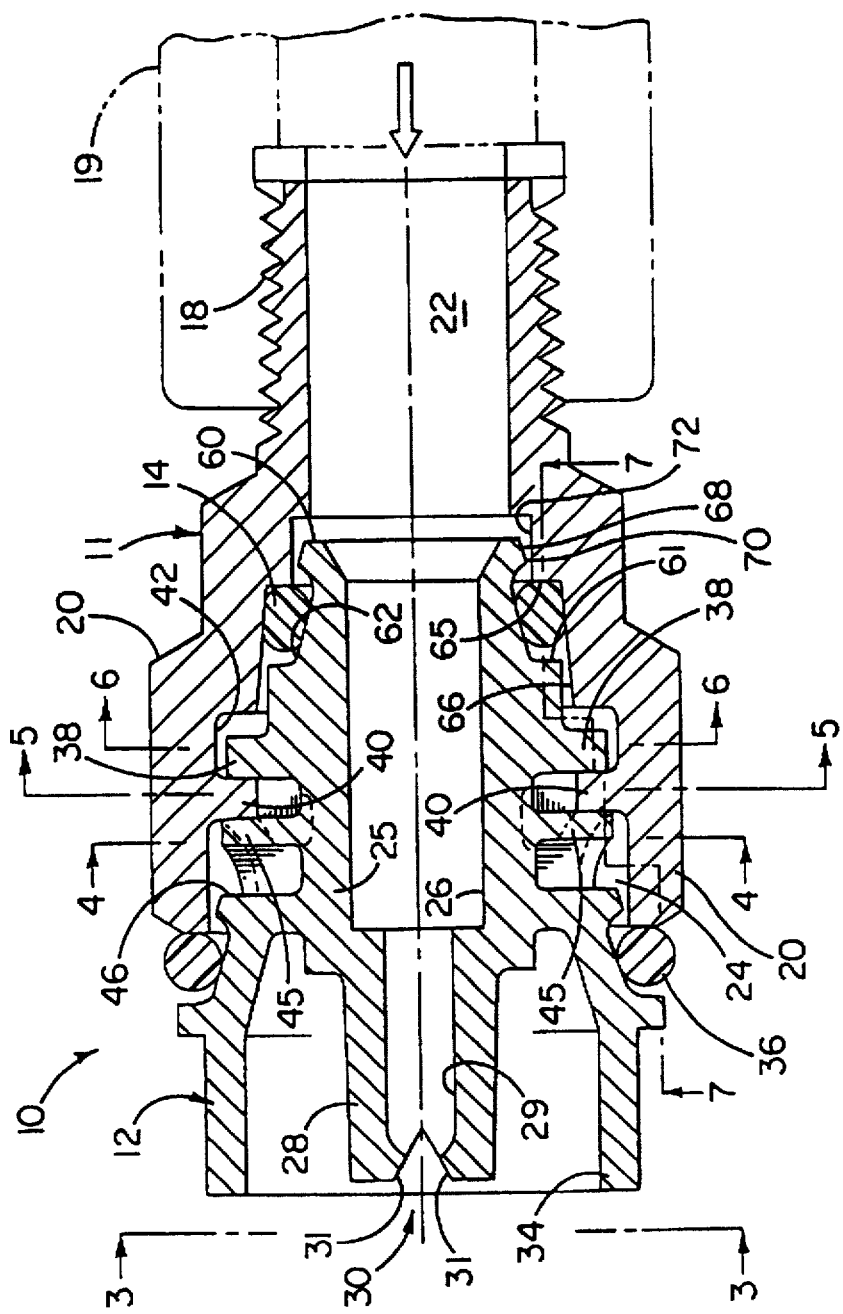
FIG. 1 is a sectional view taken longitudinally through a new and improved quick disconnect nozzle incorporating unique features of the present invention.
Figure 2:
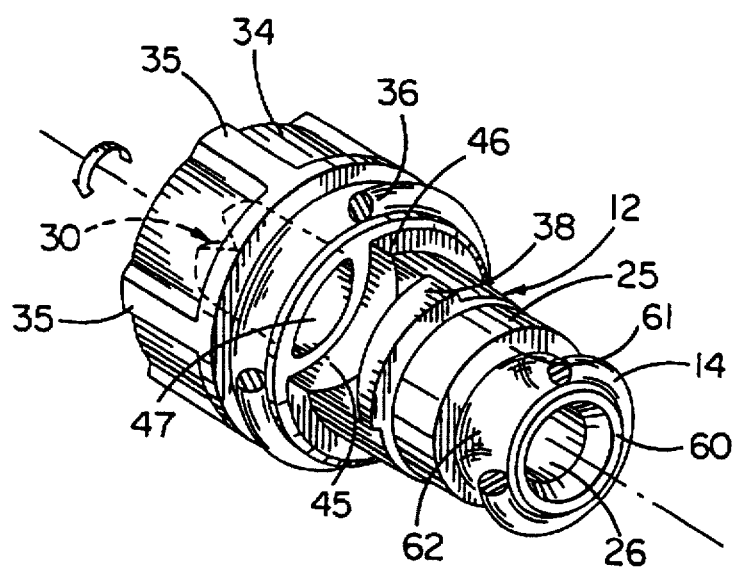
FIG. 2 is a perspective view of the spray tip of the nozzle of FIG. 1.
Figure 3:
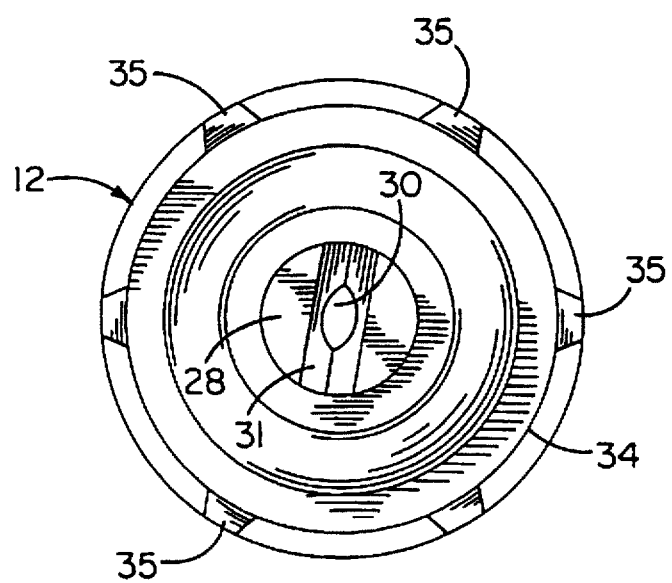
FIG. 3 is an end view of the nozzle tip as seen in the direction of the arrows of the line 3—3 of FIG. 1.
Figure 4:
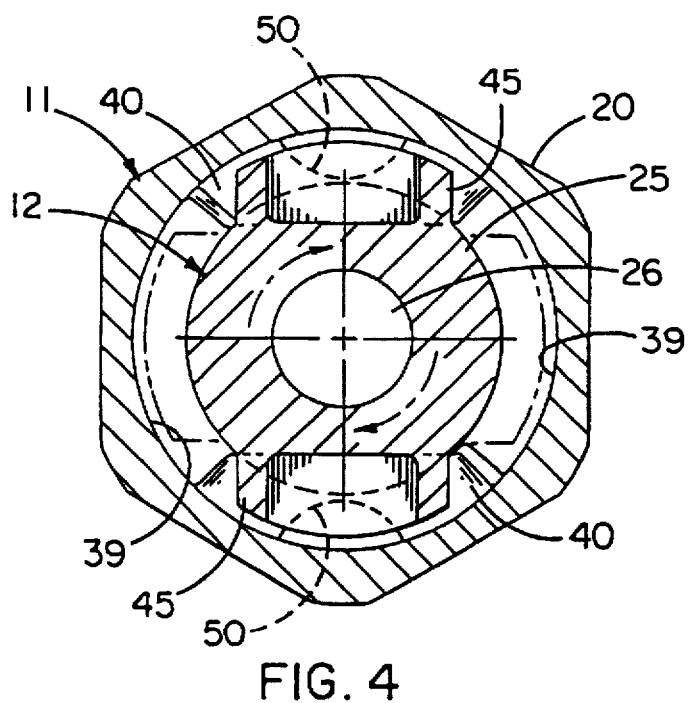
FIGS. 4, 5 and 6 are cross-sections taken substantially along the lines 4—4, 5—5 and 6—6, respectively, of FIG. 1.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in FIGS. 1–13 of the drawings as embodied in a quick disconnect nozzle 10 for spraying liquid. In certain respects, the nozzle is similar to that of Hamilton U.S. Pat. No. 5,190,224, the disclosure of which is incorporated herein by reference.

The nozzle 10 basically includes a nozzle body, 11, a spray nozzle tip 12, and a seal member 14 interposed therebetween. The nozzle body 11 and tip 12 both preferably are formed of a suitable chemically resistant plastic material that may be produced by injection molding in high capacity production equipment. The nozzle body 11 in this instance has an upstream end portion formed with external threads 18 for connecting the nozzle body 11 to a suitable conduit 19 from the source of spray fluid. A hexagonal forward portion 20 of the body 11 enables a wrench to be applied to the body to tighten the body to the conduit. The interior of the nozzle body 11 has a fluid passageway defined by an internal bore 22. Downstream of the bore 22, the body is formed with an enlarged annular chamber 24 for receiving the seal member 14 and an upstream end portion 25 of the spray nozzle tip 12.

The upstream end portion 25 of the spray tip 12 is formed with an internal fluid passageway bore 26 aligned with the internal fluid passageway bore 22 of the body 11. The spray tip 12 further includes a forward conduit portion 28 that defines a reduced diameter bore 29 which communicates with the bore 26 and terminates in a forward end formed with a spray orifice 30. The spray orifice 30 in this instance is defined by a V-shaped cut in the forward end of the conduit portion 28 so as to form a generally elongated outlet with diverging sides 31 for producing a diverging spray path. Herein, the sides 31 of the orifice are inclined at an angle of about ten degrees relative to vertical.

To facilitate gripping and turning of the nozzle tip 12, the tip has an outer, cylindrical shell 34 extending in surrounding outwardly spaced relation to the conduit portion 28. The shell 34 preferably is formed with a plurality of longitudinally extending ribs 35, which may be conveniently gripped between the installer's fingers and thumb.

In order to seal the chamber 24 from the outside environment as well as from the liquids being sprayed, an O-ring 36 is contracted around a tapered portion of the shell 34 and engages the forward end of the body 11. When the tip 12 is assembled with the body, the O-ring establishes a seal between the outside of the tip and the outside of the body in the manner explained in detail in the aforementioned Hamilton patent.

The nozzle body 11 and tip 12 are formed with cooperating camming elements which cause the tip to be drawn axially into the body when the tip is inserted endwise into the body and then is turned relative to the body. As an incident thereto, the interposed seal member 14 is compressed to establish a seal between the outside of the tip and the inside of the body and thereby seal off the passageway 22 from the chamber 24.

Herein, the camming elements on the tip 12 are formed by a pair of outwardly extending and diametrically opposed camming lugs 38 which are molded integrally with the upstream end portion of the tip. When the tip is initially inserted into the body 11, the tip is oriented such that the lugs 38 are aligned angularly with a pair of diametrically opposed notches 39 in the body (see the phantom line illustration of the lugs in FIG. 5). The notches are defined between adjacent ends of a pair of diametrically opposed camming lugs 40 (FIGS. 4–6 and 11–13) molded integrally with and projecting inwardly from the body 11, the lugs 40 forming the camming elements of the body. The lugs 40 are spaced forwardly from an axially facing shoulder 41 (FIG. 12) of the body and thus a slot 42 is defined between the shoulder and each lug 40.

Figure 5:
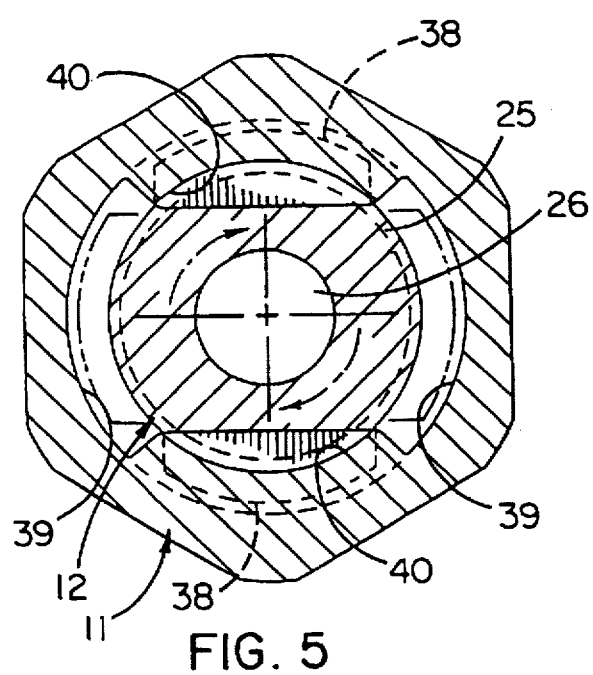
Figure 6:
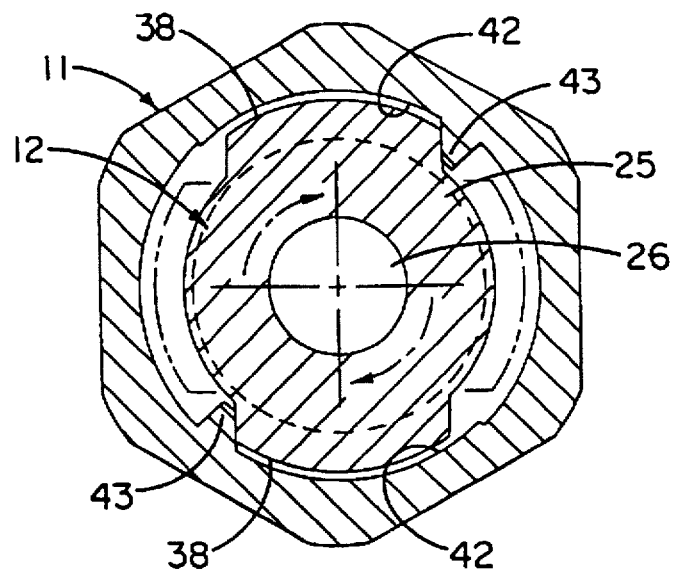
Figure 7:
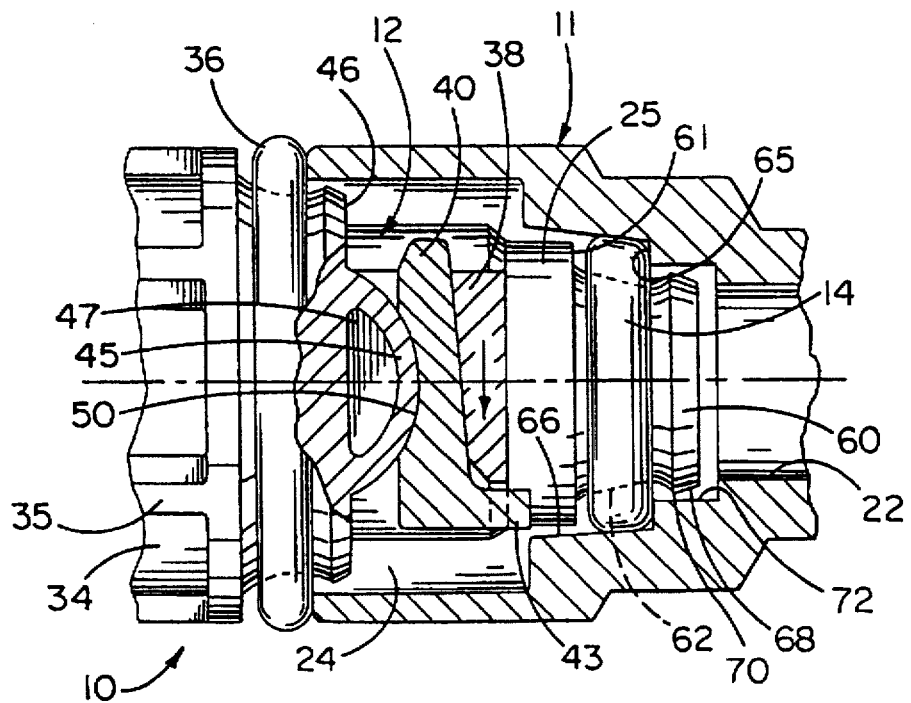
FIG. 7 is a fragmentary cross-section taken substantially along the line 7—7 of FIG. 1.
Figure 8:
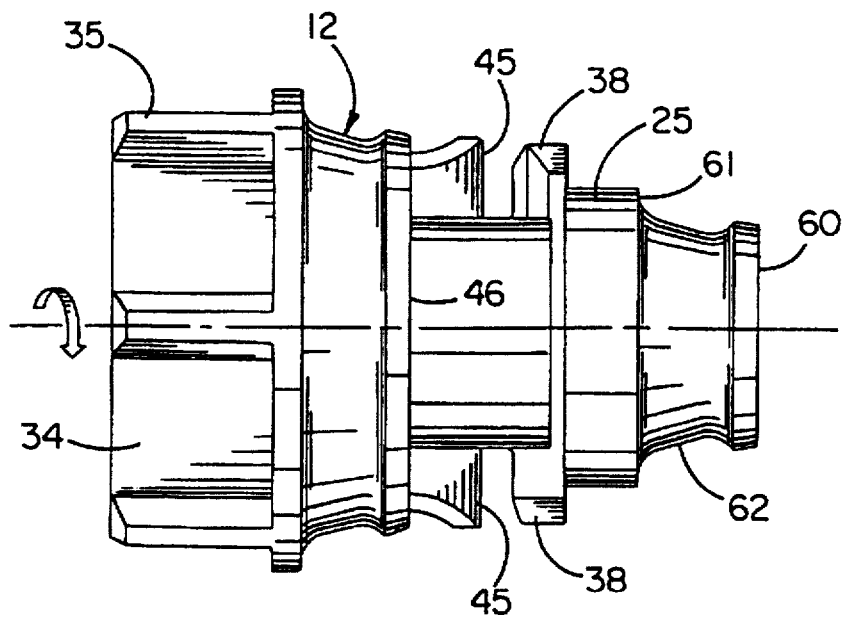
FIG. 8 is a side elevational view of the spray tip shown in FIG. 1.
Figure 9:
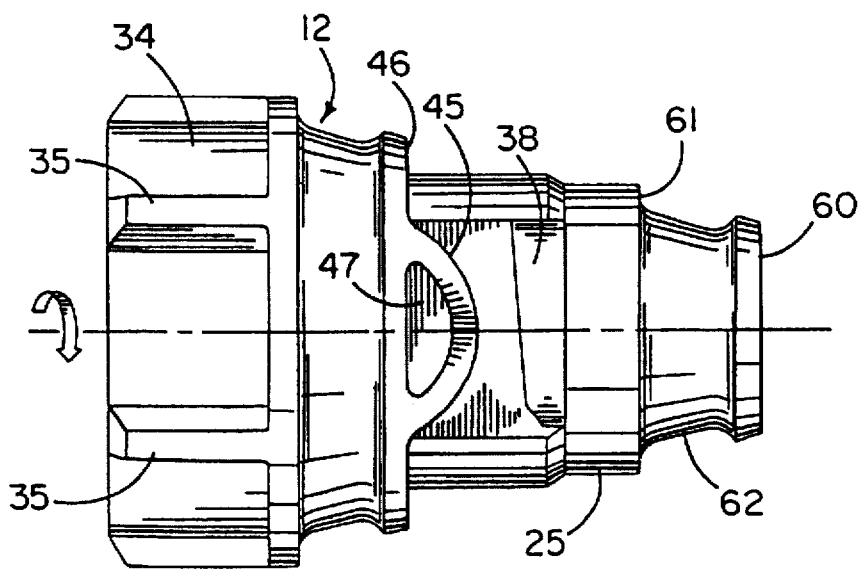
FIG. 9 is a top plan view of the spray tip shown in FIG. 1.
Figure 10:
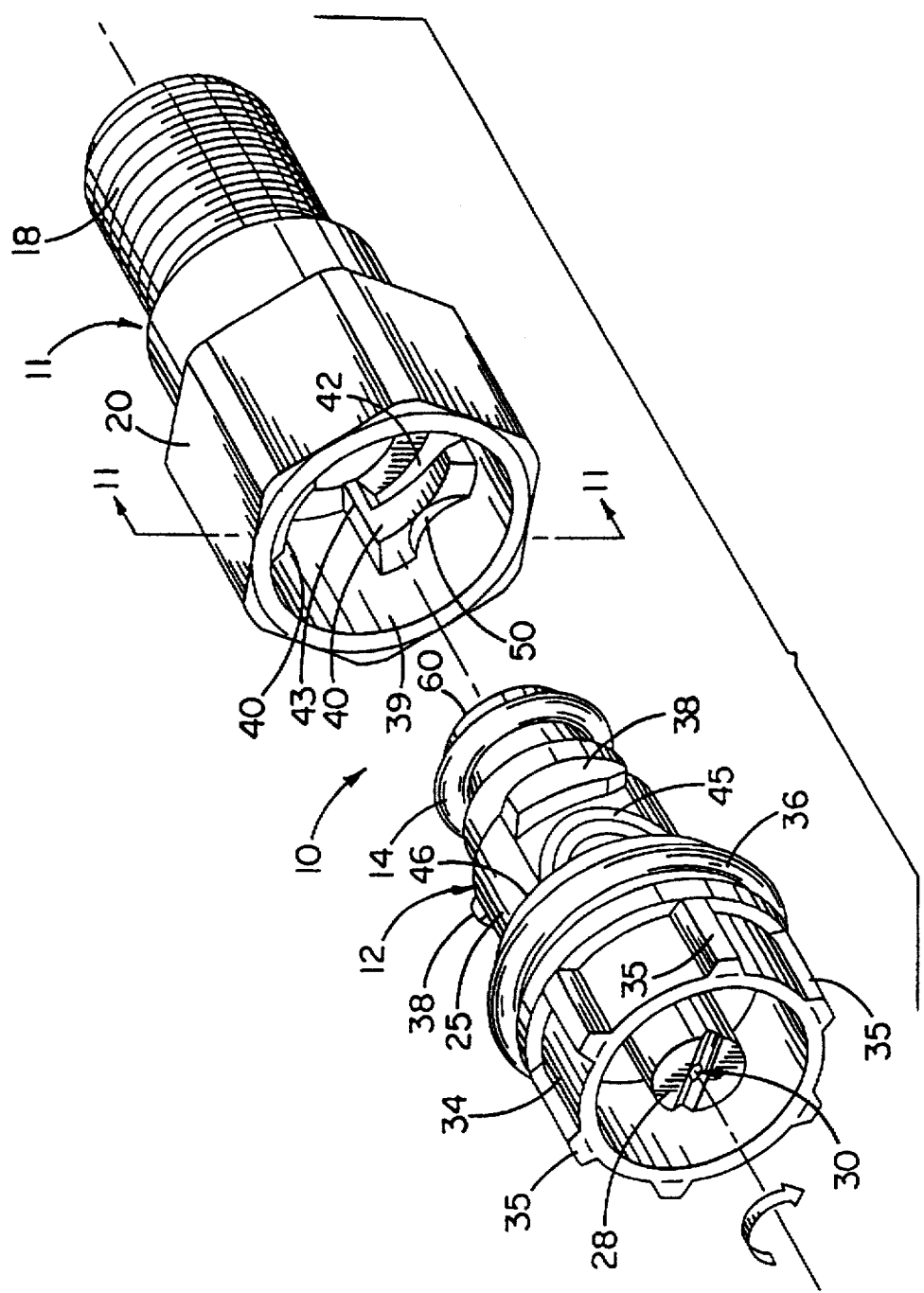
FIG. 10 is an exploded perspective view of the spray tip and the nozzle body shown in FIG. 1.
Figure 11:
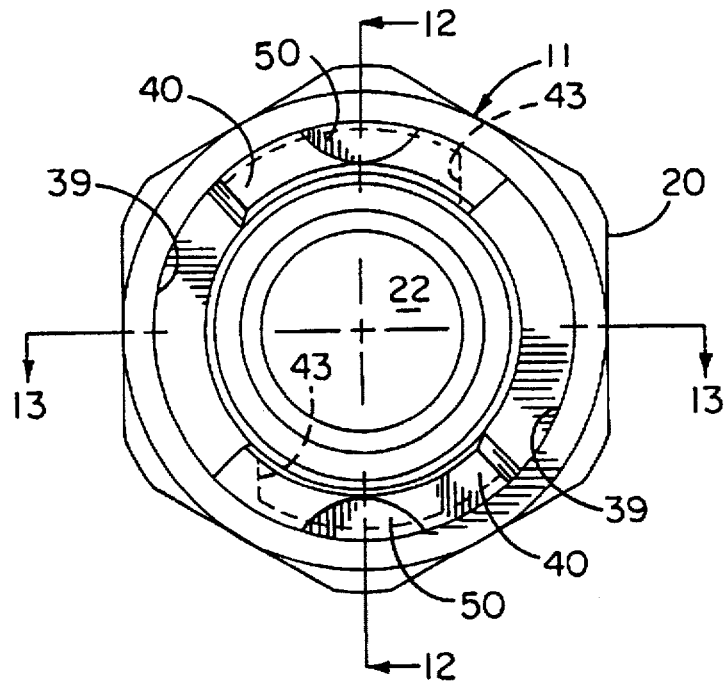
FIG. 11 is an end view of the nozzle body as seen in the direction of the arrows of the line 11—11 of FIG. 10.
Figure 12:
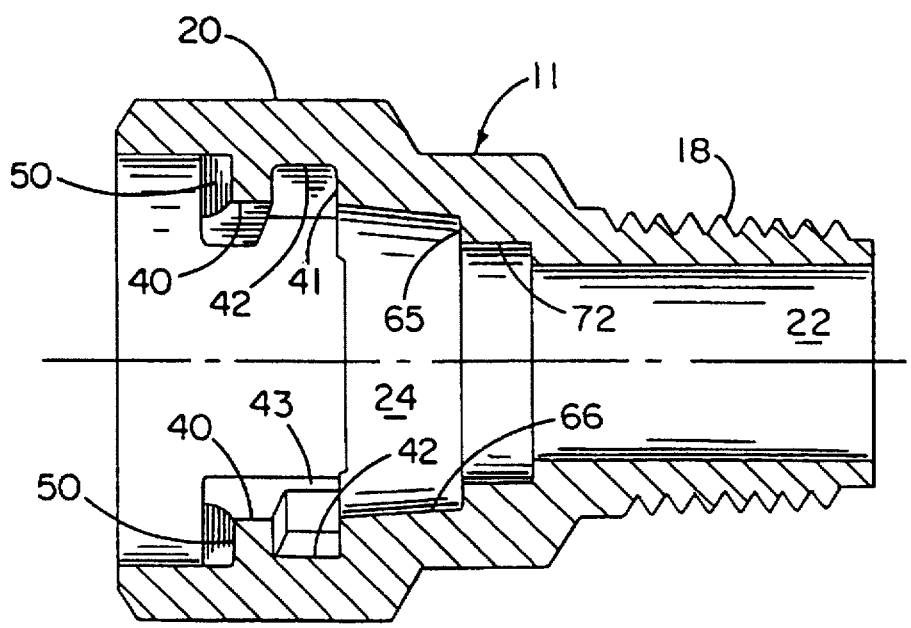
FIGS. 12 and 13 are cross-sections taken along the lines 12—12 and 13—13, respectively, of FIG. 11.
Figure 13:
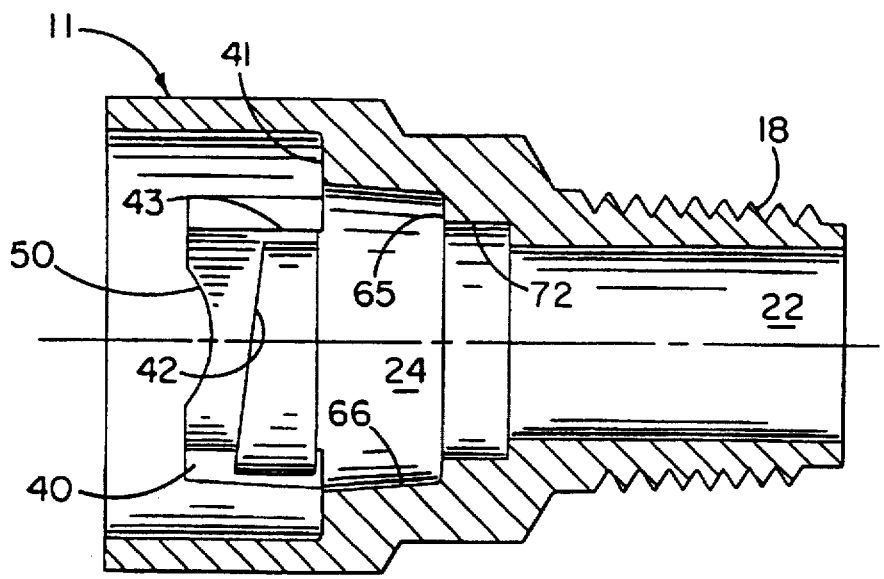

With the foregoing arrangement, the lugs 38 on the tip 12 are initially aligned angularly with the notches 39 in the body 11 as shown in phantom in FIG. 5 and pass through such notches when the tip is inserted into the body. Once the lugs 38 pass through the notches 39 and clear the lugs 40, the tip may be turned clockwise through approximately one-quarter of a turn to cause the lugs 38 to enter the slots 42. Opposing faces of the lugs 38 and 40 are angled as shown in FIG. 7 so as to produce a camming action drawing the tip axially into the body as the tip is turned in a clockwise direction. An end wall 43 (FIG. 6) is formed integrally with the body at one end of each slot 42 and projects radially inwardly from the body to close off the end of the slot. Engagement of the lugs 38 with the end walls 43 limits clockwise turning of the tip 12 to one-quarter turn.

By virtue of the lugs 38 wedgingly engaging the lugs 40, the tip 12 is held in assembled relation with the body 12 until such time as the tip is rotated relative to the body through one-quarter turn in the counterclockwise direction. When the lugs 38 become aligned with the notches 39, the tip may be slipped endwise out of the body. The lugs 38 engage the opposite sides of the end walls 43 when the tip is turned counterclockwise through one-quarter turn and thus are prevented from turning counterclockwise beyond the notches 39.

In accordance with one aspect of the present invention, resiliently flexible detent means are carried by the tip 12 and coact with detent means in the body 11 to releasably hold the tip against rotation within the body and thereby releasably retain the tip and the body in assembled relation. Formation of the resiliently flexible detent means on the tip facilitates molding of the tip and body and enables the nozzle 10 to be made relatively small so that the nozzle may be used in applications where liquid is sprayed at a low flow rate (e.g., less than one gallon per minute) or where space limitations require the use of a compact nozzle. Moreover, new resiliently flexible detent means are brought into use each time a tip is replaced with a new tip and thus the new detent means provide a reliable detenting action as well as providing the installer with a crisp detenting feel when the tip is turned to its fully installed position.

More specifically, two detents 45 are molded integrally with the tip 12 and are diametrically spaced from one another around the tip. Herein, each detent 45 is in the form of a transversely extending strip or rib of plastic having opposite ends integral with an axially facing and radially extending shoulder 46 (FIGS. 2 and 9) defined near the junction of the shell 34 with the upstream end portion 25 of the tip 12. The ribs 45 are aligned angularly with and are spaced downstream from the camming lugs 38. Each rib is curved similar to a bow and thus includes a convexly curved side which faces axially in an upstream direction and a concavely curved side which faces in the opposite direction. By virtue of such curvature, a space 47 (FIG. 7) is defined between the shoulder 46 and the concave side of the rib. The space 47 enables the rib 46 to flex resiliently toward the shoulder when axially directed forces are exerted on the rib.

The convexly curved side of the rib 45 also has a slight convex curvature in a generally radial direction, that is, in a direction extending from the outer edge of the rib toward the inner margin thereof. As a result, the shape of the convex side of the rib somewhat resembles the shape of a fingernail.

The detent means in the body 11 are in the form of recesses or pockets 50 (FIGS. 11 and 13) which are molded in the downstream sides of the camming lugs 40. Each pocket is concavely curved in two planes and thus is complementary in shape to the rib.

As the tip 12 is turned clockwise to cause the lugs 38 to cam against and interlock with the lugs 40, the ribs 45 are drawn into pressing engagement with the downstream sides of the lugs and are flexed toward the shoulder 46 as permitted by the space 47 between the shoulder and each rib. Because of the end-to-end curvature of each rib, flexing of the rib is initiated at its flexible rounded center section in contrast to a more rigid end. Additional flexibility is imparted to each rib by the slight radial curvature of the rib.

As the tip 12 reaches its fully installed position, the ribs 45 move into angular alignment with the pockets 50 and pop resiliently into the pockets so as to releasably hold the tip against counterclockwise turning. The end-to-end curvature of each rib 45 imparts spring-back resilience to the rib to cause the rib to pop into and seat in the pocket. The downstream sides of the lugs 40 may be shaped to cause greater or lesser flexing of the ribs in order to control the torque required during final turning of the tip 12 to its fully installed position.

When the tip 12 is turned counterclockwise preparatory to removing the tip from the body 11, the leading end portion of each rib 45 is cammed by the adjacent curved end of the respective pocket 50 and is flexed out of the pocket. The tip thus is released for turning of the lugs 38 into alignment with the notches 39 to permit endwise removal of the tip.

Because the flexible ribs 45 are molded on the outside diameter of the tip 12, the molding operation is easier to achieve than is the case when flexible detents are molded in the body. As a result, the present nozzle 10 may be molded in smaller sizes. In addition, more rigid plastic may be used as the material for the nozzle since the exteriorly molded ribs may be made flexible even though the plastic itself is relatively rigid.

Molding of the flexible ribs 45 on the tip 12 produces a further significant advantage in that the body 11 may be formed with simple pockets 50 which tend to retain their original shape even after tips have been inserted into and removed from the body many times. Since the pockets do not flex or wear to any appreciable degree, the detenting capability of the body does not deteriorate and thus a like-new detenting action and feel is achieved each time a new tip is inserted into the body. Accordingly, the body experiences a longer service life and remains effective for use with several replaceable tips.

The seal member 14 which is interposed between the body 11 and the tip 12 within the body is in the form of a simple O-ring. In accordance with another aspect of the nozzle 10, the O-ring 14 is carried by the tip 12 and is inserted and removed as a unit with the tip when the tip is assembled with and disassembled from the body. As a result, the installer can visually determine that the O-ring is in fact present and can easily inspect the condition of the O-ring. Moreover, mounting of the O-ring on the tip eliminates the need to use a tool to dislodge the O-ring from the body.

The O-ring 14 is carried on the extreme upstream end portion of the tip 12 and is located between a smaller diameter upstream shoulder 60 (FIGS. 7 and 8,) and a larger diameter shoulder 61 which is spaced forwardly from the shoulder 60. Defined between the shoulders is a groove whose bottom forms a ramp 62 of circular cross-section, the ramp increasing in diameter upon progressing axially from the shoulder 60 toward the shoulder 61.

The relaxed inner diameter of the O-ring 14 is smaller than the diameter of the shoulder 60 and is equal to or just slightly smaller than the smallest diameter section of the ramp 62. Thus, it is necessary to stretch the O-ring radially to enable the O-ring to clear the shoulder 60 and to be telescoped onto the ramp. When initially installed on the ramp, the O-ring is located immediately adjacent the shoulder 60 and is relaxed or virtually relaxed so that its outside diameter is at a minimum dimension.

With the outside diameter of the O-ring 14 initially being small, i.e., preferably smaller than at least the maximum inside diameter of an inclined annular inner wall 66 of the body 11, no compression of the O-ring occurs as the tip 12 is initially inserted axially into the body 11. Thus initial insertion may be effected with relatively low-effort since the O-ring does not frictionally retard the tip. When the lugs 38 move through the notches 39, the O-ring engages and stops against an axially facing annular shoulder 65 (FIGS. 1, 7 and 12) defined within the body 11. Upon rotation of the tip 12, the camming lugs 38 and 40 draw the tip further into the body 11 and, as an incident thereto, the ramp 62 moves axially relative to the O-ring 14 and expands the latter outwardly into engagement with the inclined wall 66 of the body 11. The wall 66 and the ramp 62 are sloped at different angles and thus the O-ring is subjected to a wedging action and is compressed between the wall and the ramp as the tip reaches its finally installed position. As a result, the inner diameter of the O-ring is placed in tight sealing engagement with the ramp 62 while the outer diameter of the O-ring is pressed tightly against the wall 66. Accordingly, a very good seal is established between the body and the tip in order to seal off the passageway 22 from the chamber 24.

As the tip 12 is removed from the body 11, the ramp 62 retracts from the O-ring 14 until the shoulder 60 engages the O-ring. Thereafter, the shoulder pulls the O-ring out of the body as a unit with the tip.

The shoulder 60 includes a short decreasing tapered outer surface 68 at its upstream end which results in a relatively narrow or abrupt annular ridge 70 in closest proximity to the surrounding annular wall surface 72 of the body 11. The resulting very narrow restriction between the top of the shoulder 60 and the body wall 72 creates a weak section in any solid deposit that may be formed around the end of the tip upstream of the O-ring 14, at which the deposit will fracture when the tip is withdrawn. The decreasing taper 68 also serves as a draft angle and allows the tip to be withdrawn more easily from any such deposit that remain upstream of the shoulder 60.

Because the O-ring 14 is carried with the tip 12, the installer can be certain that an O-ring of good condition is present when the tip is inserted in the body 11. Moreover, there is no need of using a tool to pry an O-ring out of the body for purposes of inspecting or replacing the O-ring.

Those familiar with the art will appreciate that a tip with a self-contained O-ring similar to the O-ring 14 could be used in the body of the nozzle of the aforementioned Hamilton patent in lieu of mounting an O-ring in the body itself. Also, a tip having detent ribs similar to the ribs 45 could be used in conjunction with a nozzle in which an O-ring is retained in the body rather than being carried by the tip.

Figure 14:
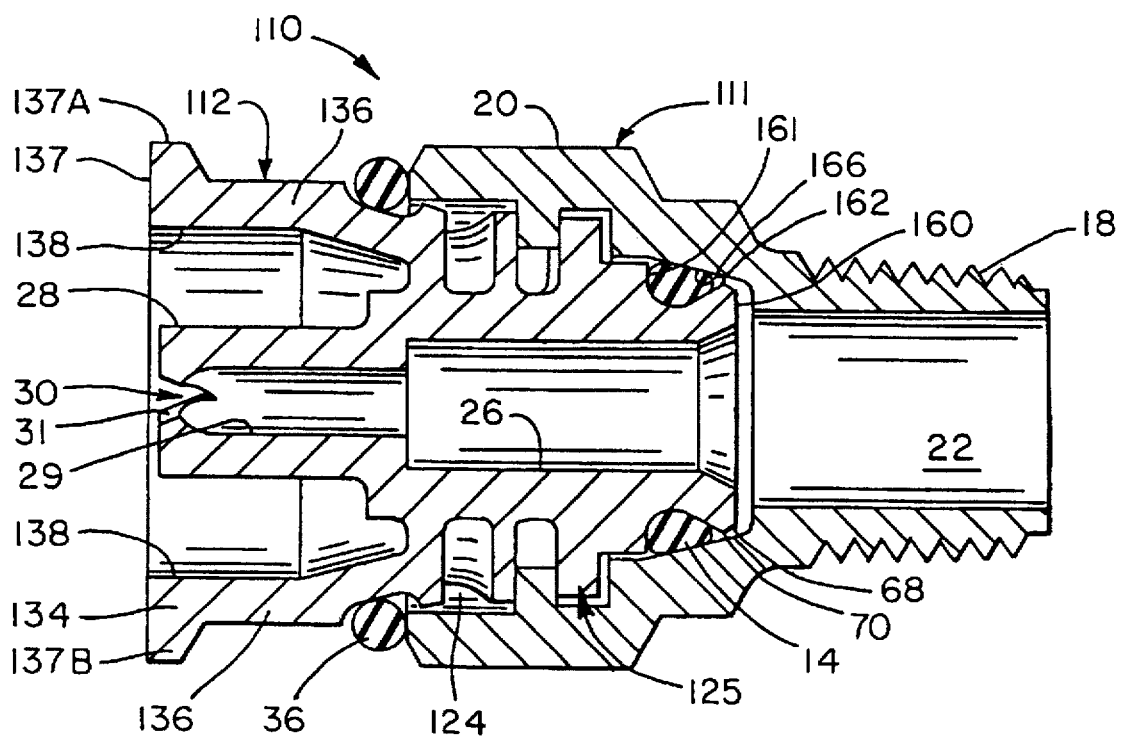
FIG. 14 is a sectional view taken longitudinally through another new and improved quick disconnect nozzle incorporating unique features of the present invention.
Figure 15:
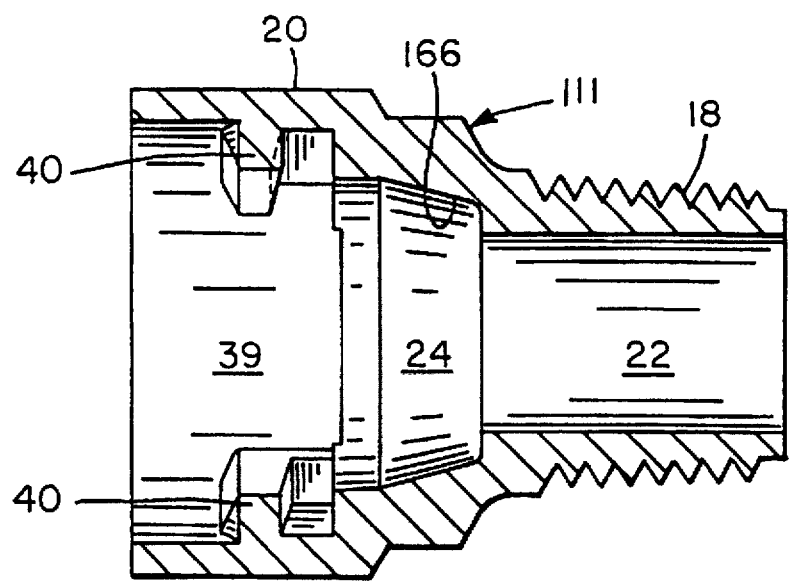
FIG. 15 is a sectional view taken longitudinally through the nozzle body shown in FIG. 14.
Figure 16:
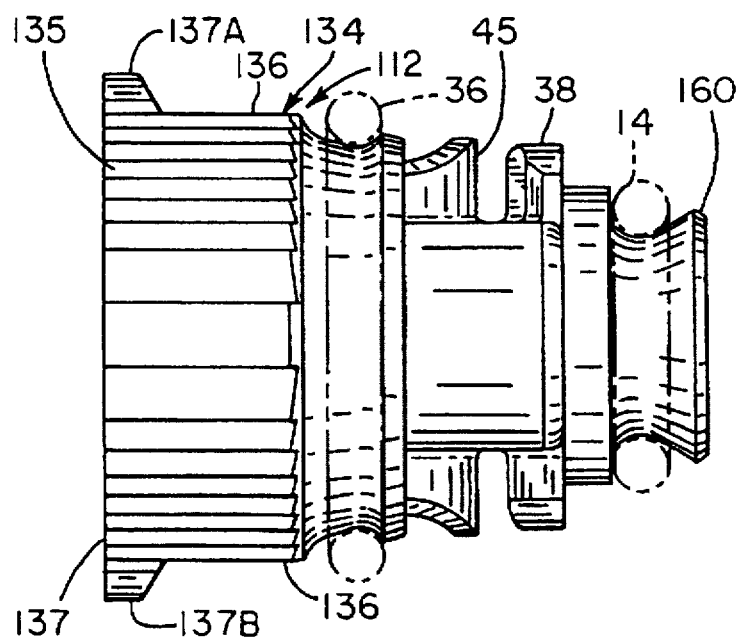
FIGS. 16 and 17 are side and end views, respectively, of the nozzle tip shown in FIG. 1, with the O-rings shown in phantom in the positions which they occupy prior to insertion of the tip into the nozzle body.
Figure 17:
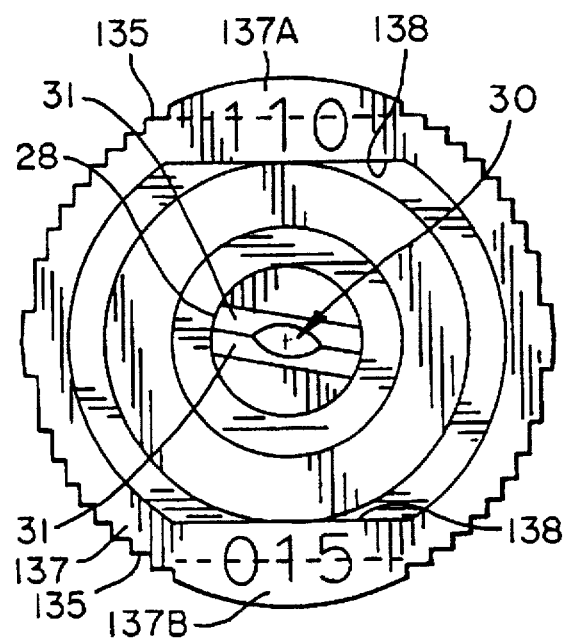
Figure 18:
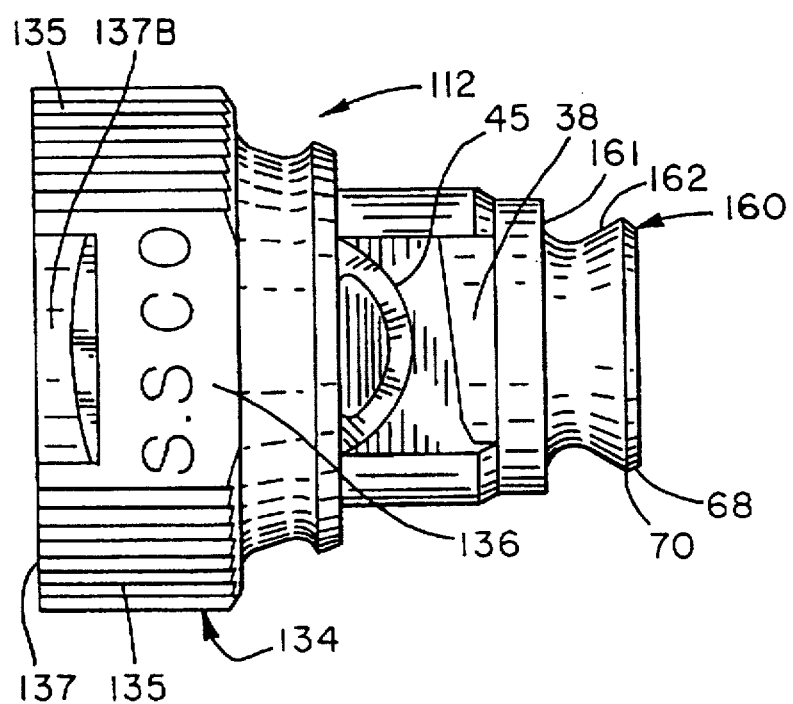
FIG. 18 is a top view of the nozzle tip of FIG. 1, without the O-rings in place.

The nozzle 110 illustrated in FIG. 14 is of the same overall configuration and has the same interlocking camming lugs and detent components and the same outer sealing ring arrangement as the nozzle 10. Accordingly, the descriptions of those elements above apply equally to the embodiment 110 as well as to the nozzle 10, and corresponding parts are identified by the same numbers as above. However, the nozzle 110 includes a different and improved seal arrangement between the upstream end of the tip and the nozzle body and a different and improved design of the outer shell of the tip. Accordingly, this is the presently preferred embodiment.

Referring to FIGS. 14–18, the nozzle 110 basically includes a nozzle body 111, a spray nozzle tip 112, and a seal member 14 interposed therebetween. The nozzle body 111 and tip 112 both preferably are formed of a suitable chemically resistant plastic material that may be produced by injection molding in high capacity production equipment. The interior of the nozzle body 111 has a fluid passageway defined by an internal bore 22. Downstream of the bore 22, the body is formed with an enlarged annular chamber 124 for receiving the seal member 14 and an upstream end portion 125 of the spray nozzle tip 112.

The upstream end portion 125 of the spray tip 112 is formed with an internal fluid passageway bore 26 aligned with the internal fluid passageway bore 22 of the body 111. The spray tip 112 further includes a forward conduit portion 28 that defines a reduced diameter bore 29 which communicates with the bore 26 and terminates in a forward end formed with a spray orifice 30. As in the nozzle 10 above, the spray orifice 30 in this instance is defined by a V-shaped recess in the forward end of the conduit portion 28 so as to form a generally elongated outlet with diverging sides 31 for producing a diverging "flat" spray pattern. However, orifices of other configurations may be provided in accordance with the patterns of the spray which is desired.

To facilitate gripping and turning of the nozzle tip 112, the tip has an outer cylindrical shell 134 extending in surrounding outwardly spaced relation to the conduit portion 28. Referring particularly to FIGS. 14, 16, 17 and 18, the shell 134 preferably is formed with a plurality of longitudinally extending serrations 135 (see FIGS. 16 and 18), which may be conveniently gripped between the installer's fingers and thumb. The shell 134 is of a generally thin-walled cylindrical configuration, with two diametrically opposite flat chordal portions 136 and a circular end which forms ear-like extensions 137A and 137B beyond (downstream from) the ends of the flat chordal portions 136.

The downstream end of the shell forms a flat generally planar annular end surface 137, which is radially wider over the ear portions 137A and 137B where it extends inward to the opposite parallel inner chordal surfaces 138 of the flat portions 136. As will be seen, these surfaces 138 extend generally parallel to the longitudinal transverse axis of the elongated orifice outlet, i.e., generally parallel to the major axis of the oval-shaped orifice opening 30 and to the groove formed by the nozzle sides 31. By so orienting the widened flat portions, convenient widened end surface areas are created for placement of legible identification and size information without impeding the normal spray patterns provided by these nozzles while maintaining the desired small overall nozzle dimensions. The opposite flat portions 136 of the shell 134 also permit convenient gripping of the nozzle tip with a wrench, plier or similar device and also provide additional convenient surfaces for placement of further informational indicia. Such indicia may be formed on the flat end and side surfaces of the shell 134 during the process of molding the tips 112 or may be created or affixed by any other means suitable to the materials and manner by which the tips are formed and suitable for preservation of the indicia in the anticipated environment of use of the nozzles, e.g., by printing, embossments or the application of appropriate labels or plates.

The nozzle body 111 and tip 112 are formed with cooperating camming elements the same as described above with respect to nozzle 10, which cause the tip to be drawn axially into the body when the tip is inserted endwise into the body and then is turned relative to the body. As an incident thereto, the interposed seal member 14 is compressed to establish a seal between the outside of the tip and the inside of the body and thereby seal off the passageway 22 from the chamber 24.

The nozzle 110 includes a different inner sealing arrangement than the nozzle 10. In nozzle 110, the O-ring 14 is carried on the extreme upstream end portion of the tip 112 and is located between a smaller diameter upstream shoulder 160 (FIGS. 14, 16 and 18) and a larger diameter substantially radial shoulder 161 which is spaced forwardly, i.e., downstream, from the shoulder 160. Defined between the shoulders is a groove that provides secure retention and positive location of the seal ring 14. The groove is formed with a rounded bottom, which fully supports the O-ring 14, and an outward taper which forms a ramp 162 of circular cross-section. The ramp increases in diameter upon progressing axially upstream from the shoulder 161 toward the shoulder 160, i.e. thereby forming a ramped surface, which causes the O-ring 14 to be positioned at the smallest diameter of the groove against the support shoulder 161.

The relaxed inner diameter of the O-ring 14 is smaller than the diameter of the shoulder 160 and is equal to or just slightly smaller than the smallest diameter section of the ramp 162. Thus, it is necessary to stretch the O-ring radially to enable the O-ring to clear the shoulder 160 and to be telescoped onto the ramp. When installed on the ramp, the O-ring is located immediately adjacent the shoulder 161 and is relaxed or virtually relaxed so that its outside diameter is at a minimum dimension.

The nozzle body 111 is formed with a tapered inner ramp wall 166 in the seating zone for the inner upstream seating and sealing end of the tip 112. The wall 166 is inclined to the line of travel of the tip during insertion, having a decreasing diameter toward the upstream end of the body. With the outside diameter of the O-ring 14 initially being small, i.e., preferably smaller than at least the maximum inside diameter of the inclined annular inner wall 166 of the body 111, no compression of the O-ring occurs as the tip 112 is initially inserted axially into the body 111. Thus initial insertion may be effected with relatively low effort since the O-ring does not frictionally retard the tip. When the lugs 38 move through the notches 39, the O-ring engages the angularly converging annular wall 166 defined within the body 111. Upon rotation of the tip 112, the camming lugs 38 and 40 draw the tip further in to the body 111. This causes compression of the O-ring between the mutually converging tapered ramp surfaces 162 and 166 as the O-ring is pressed inward by the forced advancement of the annular shoulder 161. The resultant squeezing of the O-ring causes redistribution of the cross-sectional volume of the ring, some of which expands or reforms toward the inlet end of the tip and body such as illustrated schematically in FIG. 14. The result is formation of positive compressive engagement of the O-ring with both of the surfaces 162 and 166 in a predetermined position, as well as minimizing the space available upstream of the compressed O-ring 14 for solids to deposit between the side walls of the tip 112 and the body 111.

Accordingly, a very good seal is established between the body and the tip in order to seal off the passageway 22 from the chamber 24 while allowing for a short overall length of the nozzle assembly.

As the tip 112 is removed from the body 111, the ramp 162 and the O-ring 14 retract from the surface 166. Thereafter, the shoulder 160 pulls the O-ring out of the body as a unit with the tip.

In the preferred form of the nozzle 110, there is no squeezing of the O-ring 14 until its compressive contact with the tapered body surface 166 is initiated. The inner tapered surface 162 of course retains the O-ring on the tip, against shoulder 161, and provides the ramp surface to force the deforming ring against the outer surface 166 as well as providing an inner sealing engagement surface. Both of the engagement surfaces are tapered; the outer surface 166 tapering to a decreasing diameter progressively upstream, and the inner surface 162 tapering to an increasing diameter progressively upstream. While it is believed that these angles can vary somewhat, in an illustrative prefer a nozzle of a nozzle 110 having an inner bore 22 of about ¼ diameter, the included angle defined between these surfaces is about 45°. In this embodiment the outer surface 166 is tapered inward at about 15° to the axis of the nozzle, while the inner surface 162 is tapered outward at about 30° to the same axis.

The shoulder 160 includes a short decreasing tapered outer surface 68 at its upstream end which results in a relatively short or abrupt annular ridge 70 in closest proximity to the surrounding annular wall surface 166 of the body 111. The resulting very narrow restriction between the top 70 of the shoulder 160 and the body wall 166 creates a weak section in any solid deposit that may be formed around the end of the tip upstream of the O-ring 14, in substantially the same manner and purpose as referred to above in respect to nozzle 10.

Figure 19:
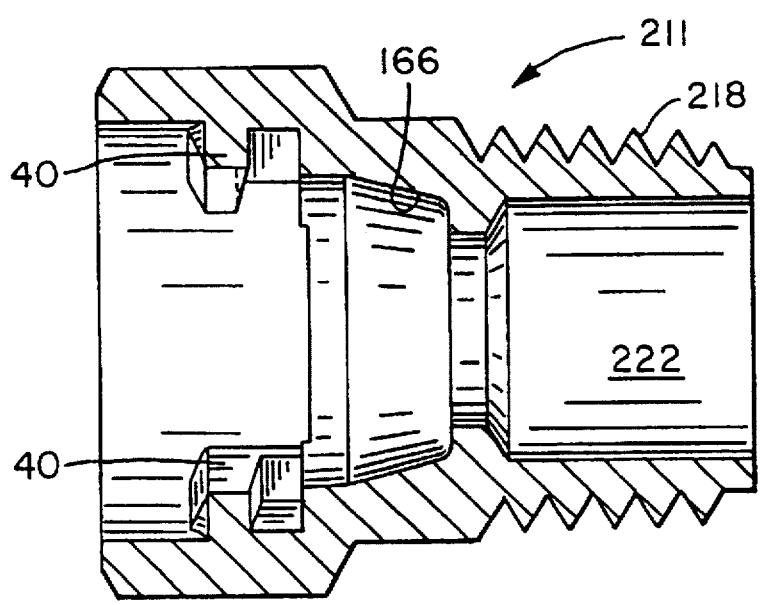
FIG. 19 is a view similar to FIG. 15, illustrating another embodiment of a nozzle body in which a nozzle tip may be mounted as in FIG. 15.

The nozzle body 211 illustrated in FIG. 19 is of the same configuration and function as the nozzle body 111 except that it is modified somewhat at the upstream end to accommodate a different set of threads 218 and a somewhat different form of the inner bore 222 while assuring an appropriate body wall thickness throughout the threaded nozzle end. The downstream portion of this nozzle body is of the same form and function as the nozzle body 111. A similar modification of the body 11 of course can be made, as well as a variety of other changes to adapt the respective nozzles 10 and 110 to various specific installations within the capabilities of those skilled in this art, particularly in light of the teachings herein.

I claim:

1. A spray nozzle comprising a tubular body, a spray tip having a discharge orifice adapted to be secured releasably in said body, an annular sealing member interposed between said tip and said body, said tip and said body having coacting cams for causing said tip and said body to be axially drawn together in response to rotation of said tip relative to said body, said sealing member being compressed between said tip and said body when said tip and said body are axially drawn together, detents on said tip and in said body and coacting to releasably hold said tip with said discharge orifice in a predetermined angular relation to said body after said tip has been rotated to said position, said detents of said body comprising interior recesses in said body, and said detents of said tip comprising external deformable ribs on said tip located to resiliently deform and then pop into and releasably seat in said recesses when said tip is turned to said predetermined position.

2. A spray nozzle as defined in claim 1 in which said recesses face axially of said body and are concavely curved, said ribs facing toward said recesses and being convexly curved.

3. A spray nozzle as defined in claim 1 in which said sealing member is located inside of said body when said tip and said body are in assembled relation, said sealing member being captivated axially on said tip and being removable from said body as a unit with said tip when said tip and said body are disassembled.

4. A spray nozzle as in claim 1 wherein said tip is formed with a narrow annular outwardly protruding ridge upstream of said annular seal, said ridge extending closely adjacent to but spaced from a surrounding surface of said body when said tip and body are in such assembled relation with said tip and body drawn axially together by said coacting means.

5. A spray nozzle as in claim 4 wherein said tip is formed with a tapered surface of progressively lesser cross-section from said ridge to the distal upstream end of said tip.

6. A spray nozzle as in claim 1 wherein said tip includes a central downstream portion having a distal end and a discharge aperture through said distal end, and a generally annular shell portion in annularly spaced surrounding relation to said downstream portion, said shell portion having a distal end around said distal end of said central portion, at least one portion of said distal end of said shell portion defining a planar end surface having a radial width which is substantially greater than the radial thickness of said shell portion.

7. A spray nozzle as in claim 6 wherein said shell includes an upstream portion of a generally circular cylindrical configuration with two diametrically opposed generally flat portions, said shell including a downstream end portion which includes an ear portion extending outward beyond the outer surface of each of said flat portions.

8. A spray nozzle as defined in claim 1 in which said spray tip detent ribs each define a respective space for enhancing resiliency and into which the rib deforms when being moved into seating relation with a body detent recess.

9. A spray nozzle having a tubular body and having an apertured spray tip adapted to be secured releasably in said body, an annular sealing member interposed between said tip and said body, first angularly spaced camming lugs in said body, second angularly spaced camming lugs on said tip and coacting with said first camming lugs to cause said tip to be drawn axially into said body in response to rotation of said tip relative to said body, said sealing member being compressed between said tip and said body when said tip is drawn axially into said body, detent means on said tip and in said body and coacting to releasably hold said tip in a predetermined angular position in said body after said tip has been rotated to said position, said detent means in said body comprising angularly spaced and axially opening recesses formed in said first camming lugs, said detent means on said tip comprising angularly spaced and resiliently yieldable ribs on said tip and located to resiliently pop into and seat in said recesses when said tip is turned to said predetermined position, a shoulder formed integrally with said tip and facing axially toward said recesses, each of said ribs comprising a strip having ends integrally joined to said shoulder, each strip having an intermediate portion joined to said ends and spaced axially from said shoulder whereby said intermediate portion may flex toward and spring away from said shoulder.

10. A spray nozzle as defined in claim 9 in which said intermediate portion of each strip includes a curved side facing toward said recesses, said curved side defining a convex curve extending between the ends of said rib.

11. A spray nozzle as defined in claim 10 in which the curved side of each strip also defines a generally radially extending convex curve.

12. A spray nozzle as defined in claim 9 in which said ribs are spaced axially from and are aligned angularly with said second camming lugs.

13. A spray nozzle having a tubular body and having an apertured spray tip adapted to be secured releasably in said body, said nozzle having a longitudinal axis, coacting cams on said tip and said body for causing said tip and body to be drawn axially together when said tip is rotated in one direction relative to said body, said cams causing said tip to be retracted away from said body when said tip is turned in the opposite direction relative to said body, an annular seal interposed between said tip and said body and positioned inside of said body so as to be pressed into sealing engagement with said tip and with the interior of said body when said tip and body are drawn axially together, said tip including an upstream end portion having at least one annular shoulder and an annular ramped surface extending upstream thereof and progressively increasing in diameter in the upstream direction, said O-ring being disposed at least in part on said ramped surface and having a relaxed inner diameter smaller than the diameter of said shoulder, the diameter of at least a portion of said ramped surface being greater than the relaxed inner diameter of said O-ring such that when said O-ring is positioned on said ramped surface it is urged against said shoulder, the interior of said body including an annular ramped surface spaced radially outwardly from the ramped surface of said tip and decreasing in diameter in an upstream direction, the ramped surface of said body and the ramped surface of said tip being inclined at different angles for engaging said O-ring and compressing the O-ring between said ramped surfaces and said shoulder when said tip is fully inserted into said body.

14. A spray nozzle as in claim 13 wherein said tip has a second shoulder at an upstream end of said ramped surface.

15. A spray nozzle as in claim 13 wherein said tip is formed with a narrow annular outwardly protruding ridge upstream of said annular seal, said ridge extending closely adjacent but spaced from said ramped surface of said body when said tip is fully inserted in said body with said tip an body drawn axially together by said coacting means.

16. A spray nozzle as in claim 15 wherein said tip is formed with a tapered surface of progressively lesser cross-section from said ridge to the distal upstream end of said tip.

17. A spray nozzle comprising a tubular body, a spray tip adapted to be secured releasably in said body, said tip having an orifice at a downstream end through which liquid is discharged and including an upstream portion having a shoulder facing upstream and having a ramped surface of circular cross-section adjacent said shoulder on the upstream side thereof, said ramped surface progressively increasing in diameter upstream from said shoulder, said body having a downstream portion of a configuration to receive said upstream portion of said tip therein, said downstream portion including a ramped surface of circular cross-section spaced radially outwardly from the ramped surface of said tip, said ramped surface of said body progressively decreasing in diameter in an upstream direction, coacting cams on said tip and said body for causing said tip and body to be drawn axially together when said upstream portion of said tip is inserted in said downstream portion of said body and said tip is rotated in one direction relative to said body, said cams causing said tip to be retracted away from said body when said tip is turned in the opposite direction relative to said body, an annular seal disposed around said tip portion adjacent said shoulder and opposite said ramped surface of said body so as to be pressed into sealing engagement with each of said ramp surfaces and said shoulder when said tip and body are drawn axially together.

18. A spray nozzle as defined in claim 17 wherein said annular seal is captivated axially on said tip and is removable from said body as a unit with said tip when said tip is retracted out of said body.

19. A spray nozzle as defined in claim 17 wherein said annular seal is captivated axially on said tip between said shoulder and an upstream portion of said ramped surface of said tip and is removable from said body as a unit with said tip when said tip is retracted out of said body.

20. A spray nozzle as in claim 17 wherein said ramped surface of said tip extends generally at a first angle to the longitudinal axis of said nozzle, said ramped surface of said body extends generally at a second angle to said longitudinal axis and said first angle substantially exceeds said second angle.

21. A spray nozzle comprising a tubular body, a removable and replaceable apertured spray tip adapted to be secured releasably in said body, coacting cams on said tip and said body for causing said tip and body to be drawn axially together when said tip is rotated in one direction relative to said body, said cams causing said tip to be moved away from said body when said tip is turned in the opposite direction relative to said body, an annular seal interposed between said tip and said body and positioned inside of said body so as to be pressed into sealing engagement with said tip and with the interior of said body when said tip and body are drawn axially together, said tip including a central downstream portion having a distal end and a discharge aperture through said distal end, and a generally cylindrical shell portion in annularly spaced surrounding relation to said downstream portion, said shell portion having a distal end around said distal end of said downstream portion, at least one portion of said distal end of said shell portion defining an indicia bearing planar end surface having a radial width which is substantially greater than the radial thickness of said cylindrical shell portion.

22. A spray nozzle as in claim 21 wherein said shell includes an upstream portion of a generally circular cylindrical configuration with two diametrically opposed generally flat portions, said shell including a downstream end portion which includes an ear portion extending laterally outward beyond the outer surface of each of said flat portions.

23. A spray nozzle as in claim 22 wherein said flat portions of said upstream portion are chords of said cylindrical configuration.

24. A spray nozzle as in claim 23 wherein said planar end surface has a circular outer periphery corresponding to the cylinder defined by said generally cylindrical configuration of said upstream portion of said shell and an inner periphery corresponding to the inner periphery of said upstream portion which includes said flat portions.

25. A spray nozzle as in claim 21 which includes visually readable indicia on said planar end surface.

26. A spray nozzle having a tubular body and having an apertured spray tip adapted to be secured releasably in said body, said tip including an upstream portion having a shoulder facing upstream and having a ramped surface of circular cross-section adjacent said shoulder on the upstream side thereof, said ramped surface extending at an angle of about 30 degrees to a longitudinal axis of said nozzle progressively increasing in diameter upstream from said shoulder, said body having a downstream portion of a configuration to receive said upstream portion of said tip therein, said downstream portion including a ramped surface of circular cross-section spaced radially outwardly from the ramped surface of said tip, said ramped surface of said body extending at an angle of about 15 degrees to said longitudinal axis progressively decreasing in diameter in an upstream direction, the included angle between said surfaces being about 45 degrees, coacting means on said tip and said body for causing said tip and body to be drawn axially together when said upstream portion of said tip is inserted in said downstream portion of said body and said tip is rotated in one direction relative to said body and for thereafter releasably holding said tip against rotation relative to said body, said means permitting said tip to be released from and retracted out of said body when said tip is turned in the opposite direction relative to said body, an annular seal disposed around said tip portion adjacent said shoulder and opposite said ramped surface of said body so as to be pressed into sealing engagement with each of said ramp surfaces when said tip and body are drawn axially together.

27. A spray nozzle having a tubular body and having an apertured spray tip adapted to be secured releasably in said body, said tip including an upstream portion having a shoulder facing upstream and having a ramped surface of circular cross-section adjacent said shoulder on the upstream side thereof, said ramped surface extending at a first angle to a longitudinal axis of said nozzle progressively increasing in diameter upstream from said shoulder, said body having a downstream portion of a configuration to receive said upstream portion of said tip therein, said downstream portion including a ramped surface of circular cross-section spaced radially outwardly from the ramped surface of said tip, said ramped surface of said body extending at a second angle to said axis progressively decreasing in diameter in an upstream direction, the included angle between said surfaces being about 45 degrees, coacting means on said tip and said body for causing said tip and body to be drawn axially together when said upstream portion of said tip is inserted in said downstream portion of said body and said tip is rotated in one direction relative to said body and for thereafter releasably holding said tip against rotation relative to said body, said means permitting said tip to be released from and retracted out of said body when said tip is turned in the opposite direction relative to said body, an annular seal disposed around said tip portion adjacent said shoulder and opposite said ramped surface of said body so as to be pressed into sealing engagement with each of said ramp surfaces when said tip and body are drawn axially together.

28. A spray nozzle comprising a tubular body and having an apertured spray tip adapted to be secured releasably in said body, an annular sealing member interposed between said tip and said body, said tip and said body having coacting cams for causing said tip and said body to be axially drawn together in response to rotation of said tip relative to said body, said sealing member being compressed between said tip and said body when said tip and said body are axially drawn together, detents on said tip and in said body and coacting to releasably hold said tip in a predetermined angular position in said body after said tip has been rotated to said position, said detents on said body comprising concavely curved, axially facing recesses in said body, said tip being molded of plastic and having a shoulder facing said recesses, said detents on said tip comprising convexly curved ribs on said tip facing said body recesses and being located to resiliently deform and then pop into and releasably seat in said recesses when said tip is turned to said predetermined position, and said ribs each comprising a strip having ends molded integrally with said shoulder and having a curved intermediate portion spaced axially from said shoulder whereby said curved portion may flex toward and spring away from said shoulder.

* * * * *